United States Patent [19]

Loos

[11] 4,155,677
[45] May 22, 1979

[54] TOOTHED TOOL FOR THE CUTTING DEBURRING OF GEARS

[75] Inventor: Herbert Loos, Dorfen, Fed. Rep. of Germany

[73] Assignee: Carl Hurth Maschinen- und Zahnradfabrik, Munich, Fed. Rep. of Germany

[21] Appl. No.: 855,984

[22] Filed: Nov. 30, 1977

[30] Foreign Application Priority Data

Dec. 28, 1976 [DE] Fed. Rep. of Germany ....... 2659108

[51] Int. Cl.² ............................................. B26D 1/12
[52] U.S. Cl. ..................................................... 407/27
[58] Field of Search .......................... 407/27; 90/1.6 A

[56] References Cited

U.S. PATENT DOCUMENTS

| 616,648 | 12/1898 | Beale | 407/27 |
| 2,123,026 | 7/1938 | Simmons | 407/27 X |
| 2,295,148 | 9/1942 | Witham | 407/27 |
| 3,786,601 | 1/1974 | Seidensticker | 90/1.6 A |
| 4,068,558 | 1/1978 | Loos | 407/27 X |

FOREIGN PATENT DOCUMENTS 740442 10/1943 Fed. Rep. of Germany ......... 90/1.6 A

*Primary Examiner*—Harrison L. Hinson
*Attorney, Agent, or Firm*—Blanchard, Flynn, Thiel, Boutell & Tanis

[57] ABSTRACT

An improvement in a deburring or chamfering tool mountable on at least one face of a guide gear of the type disclosed in U.S. Pat. No. 4,068,558. The teeth of the tool have on one axially facing side thereof grooves extending from one edge of the tooth to the other thereof. The tool is generally disk-shaped and the grooves are either ring-shaped or shaped in the form of a spiral. Multiple grooves can be provided on the axial face of the disk and the edges which are formed at a location where the grooves intersect a tooth form cutting edges.

6 Claims, 5 Drawing Figures

TOOTHED TOOL FOR THE CUTTING DEBURRING OF GEARS

FIELD OF THE INVENTION

The invention relates to a toothed tool and, more particularly, relates to a disk-shaped tool having teeth thereon with grooves provided on at least one axial side thereof, which grooves are provided on at least an axially facing side of the teeth and the locations where the grooves intersect the edges of the teeth form cutting edges.

BACKGROUND OF THE INVENTION

Tools have already become known, which matingly roll along the workpiece at parallel arranged axes wherein the teeth of the tool are designed such that they conically engage from the face the workpiece teeth. This conical action is achieved by the tool teeth being constructed indeed conically or by a tool having sloped teeth wherein the tool tooth edges can be sloped on the tooth sides to form an obtuse angle without special design with the respective face. In these known tools, the cutting edges which lie in longitudinal direction of the teeth are worked in crestlike from the face, namely such that the grooves extend longitudinally of the tool tooth flanks. According to a different known construction, the teeth are constructed of different height, so that the addendum edges of the teeth form the said cutting edges. These tools operate very satisfactorily, however, forming of the cutting edges is difficult and correspondingly expensive. (German OS No. 23 19 060).

Therefore, the basic purpose of the invention is to provide a toothed tool of the above described type wherein the cutting edges can be worked in more economically.

SUMMARY OF THE INVENTION

The basic purpose of the invention is met by providing a toothed tool in the form of a disk having teeth thereon, each of said teeth having grooves in at least one surface thereof, which grooves form cutting edges. The cutting edges are thereby not formed by the longitudinal edges of the grooves, as in the known tools, but by the groove walls wherein through nonparallel groove walls, for example walls which converge toward the bottom of the groove, still special cutting angles can be achieved. The grooves can be mounted on one face of the tool or on both faces. In the latter case the tool, when it has become dull, can be reversed.

The tool according to the invention has furthermore the advantage that nontoothed blanks which, however, have grooves, can be prefabricated and can be stored and that the teeth need to be worked into said blanks only after the individual work task exists. Thus it is possible to produce the tools in greater amounts and with less volume of inventory. From the standpoint of a rational manufacture of the tool, it is possible to manufacture the tool so that the cutting edges are formed by at least one groove which is either ring-shaped or spiral-shaped.

A favorable development of the invention is provided by making the tool so that the cutting edges are formed by a multithread spiral arrangement because then the cutting edges are staggered from tooth to tooth in direction of the tooth heights and a gapless working of the workpiece (deburring) is assured. Also this development is particularly advantageous for the manufacture of the tool. Of course, a single-thread spiral is also possible.

Further advantages and characteristics can be taken from the following description.

BRIEF DESCRIPTION OF THE DRAWINGS

The invention is described with reference to one exemplary embodiment illustrated in FIGS. 1 to 3.

DETAILED DESCRIPTION

Figure 4:
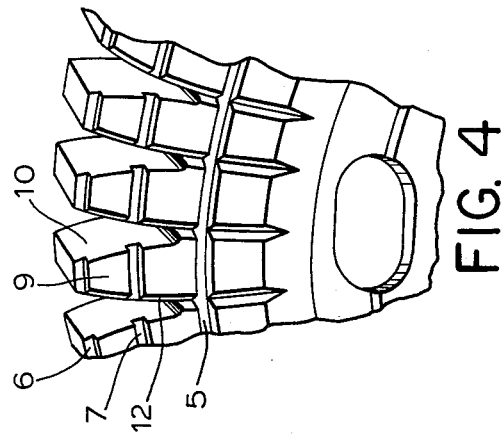
FIG. 4 is an enlarged perspective fragment of a portion of the tool.
Figure 5:
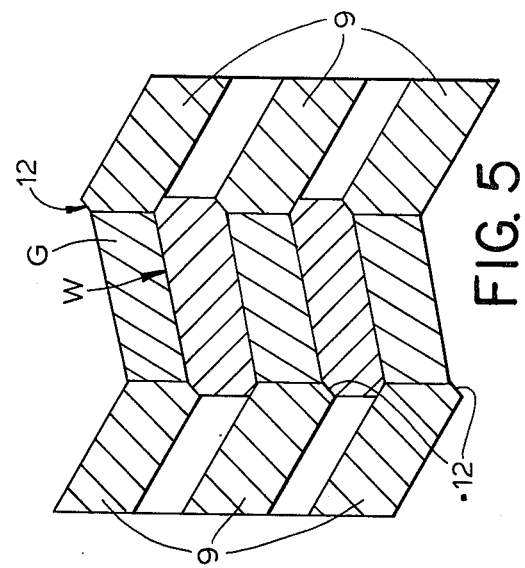
FIG. 5 is a sectional view of the teeth of a pair of spaced tools working a workpiece.
Figure 1:
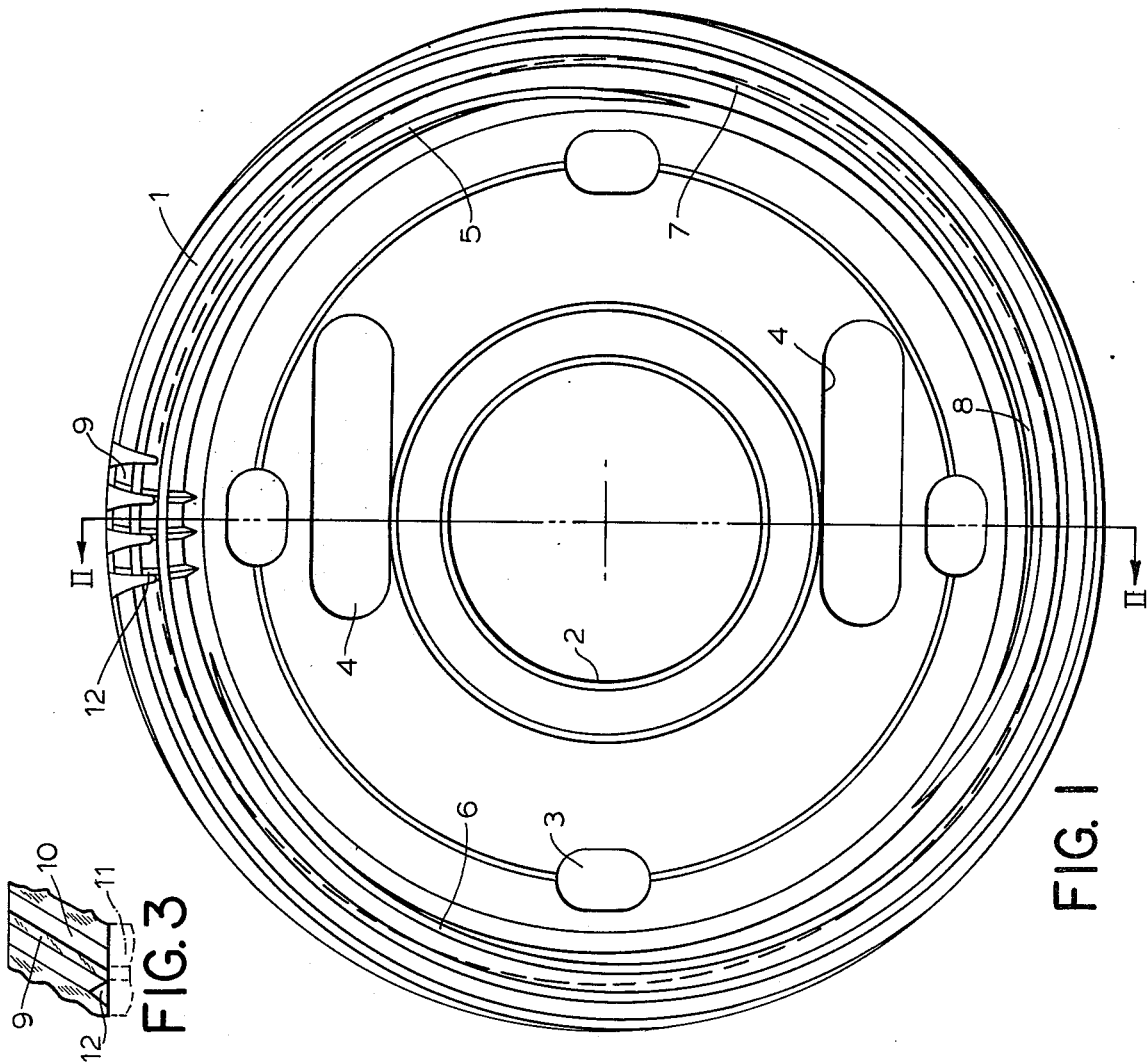
FIG. 1 illustrates an axial face of a tool embodying the invention; only three of the teeth are illustrated.
Figure 2:
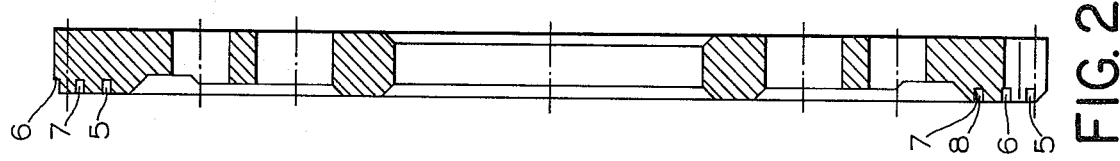
FIG. 2 illustrates a cross-sectional view taken along the line II—II of FIG. 1.

FIG. 1 illustrates a front view and FIG. 2 a cross-sectional view of a tool embodying the invention. During the manufacture preferably first a circular disk 1 is manufactured, the outside diameter of which is greater than is needed for the later formation of teeth on a workpiece W (FIG. 5). A center bore 2 is provided in the disk for receiving and centering a tool carrier therein and, in addition, plural fastening holes 3 are provided in the disk to facilitate a fastening of the disk to a guide gear or disk and a clamping of the guide gear between a pair of the disks. A single tool (disk) and guide gear assembly and if necessary a pair of inventive tools (disks) arranged on opposite sides of the guide gear (see guide gear G in Fig. 5) are adapted to mate with the workpiece. Furthermore, two slotted holes 4 are provided in the disk between the central bore 2 and the outer periphery to facilitate an adjustment of the disk relative to the guide gear and if necessary to the second tool arranged on the opposite side of the guide gear. Such a device is the subject matter of U.S. Pat. No. 4,068,558. Three spiral-shaped grooves 5, 6 and 7 are machined into the disk on the axially facing or front side thereof remote from the guide gear. The walls 8 of the grooves extend toward the base of the groove and form cutting edges at the location where the grooves intersect the flanks of the peripheral teeth described in more detail below. These cutting edges facilitate a deburring or chamfering of the axially facing edges on the workpieces.

Figure 3:
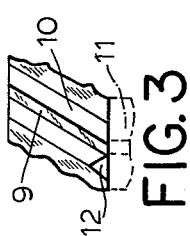
FIG. 3 illustrates in an enlarged scale a tooth of a helically toothed tool according to the invention, viewed onto the tooth addendum.

The outer periphery of the disk is provided with teeth 9 as aforesaid which are machined to fittingly mesh with the tooth structure on the workpiece. The teeth can be constructed conically, so that they penetrate from the front face into the tooth gaps of the tool and they also can advantageously be designed in such a manner, as is illustrated schematically in FIG. 3. FIG. 3 illustrates a tool tooth, namely viewed onto the tooth addendum. The tooth forms a helix angle of such a size that one tooth flank 10 corresponds with the edge to be produced on the tooth 11 of the workpiece. The other edge is formed by a sloped or bevelled portion 12.

The backside of the disk is formed without grooves in the illustrated example. Here too grooves can be provided in order to be able to make the tool useful on both sides.

The invention is not to be limited specifically to the illustrated spiral-shaped grooves; they may also extend for example straight over the front face. Care must then be taken that these grooves terminate at the necessary angle to the flanks of the workpiece teeth.

The groove walls 8 are drawn parallel in FIG. 2. However, it is possible for the grooves to have, of course, also any other advantageous cross sections, for example the groove walls can converge toward the base.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A rotary deburring and chamfering tool, comprising a disk having a periphery and axially facing sides, said periphery having a plurality of circumferentially spaced teeth thereon with circumferentially facing flanks, at least one of said axially facing sides having cutting edge means thereon, said cutting edge means being formed by a groove in said axially facing side and which extends over an axially facing side of each tooth and intersects said flanks so that the side walls of said groove at the place of intersection thereof with said flanks define axially extending cutting edge means.

2. The tool according to claim 1, wherein said groove is a spiral-shaped groove.

3. The tool according to claim 2, wherein plural spiral grooves are provided on said disk adjacent said periphery.

4. The tool according to claim 1, wherein the teeth on said periphery of said disk have a bevelled edge on at least one axial tooth edge.

5. The tool according to claim 4, wherein said teeth on said tool are helical teeth and wherein a helical edge is provided on the side of the teeth wherein said flanks facing away from said axially facing side form an obtuse angle with said axially facing side.

6. The tool according to claim 1, wherein said groove extends around said disk adjacent said periphery.

* * * * *